United States Patent [19]

Fyson

[11] Patent Number: 5,419,840
[45] Date of Patent: May 30, 1995

[54] EFFLUENT TREATMENT

[75] Inventor: John R. Fyson, London, Great Britain

[73] Assignee: Eastman Kodak Company, Rochester, N.Y.

[21] Appl. No.: 78,201

[22] PCT Filed: Dec. 16, 1991

[86] PCT No.: PCT/EP91/02418
§ 371 Date: Jun. 17, 1993
§ 102(e) Date: Jun. 17, 1993

[87] PCT Pub. No.: WO92/11208
PCT Pub. Date: Jul. 9, 1992

[30] Foreign Application Priority Data

Dec. 18, 1990 [GB] United Kingdom ............... 9027429

[51] Int. Cl.$^6$ ................................. C02F 1/72
[52] U.S. Cl. ..................... 210/759; 210/763; 210/908; 210/910
[58] Field of Search ............ 210/759, 763, 765, 766, 210/908, 910, 917

[56] References Cited

U.S. PATENT DOCUMENTS

| | | | |
|---|---|---|---|
| 3,721,624 | 3/1973 | Fisch et al. | 210/759 |
| 4,332,687 | 6/1982 | Daignault et al. | 210/759 |
| 4,693,833 | 9/1987 | Toshikuni et al. | 210/759 |
| 5,178,772 | 1/1993 | Daley et al. | 210/759 |

FOREIGN PATENT DOCUMENTS 3735903  3/1989  Germany.
85/02690  6/1985  WIPO.

OTHER PUBLICATIONS

Journal of Imaging Technology, vol. 14, No. 6, Dec. 1988, Springfield US, pp. 154–156; H. Knorre, et al.: "Chemical Treatment of Effluent from Photofinishing Plants".

*Primary Examiner*—Thomas Wyse
*Attorney, Agent, or Firm*—Sara Meeks Roberts

[57] ABSTRACT

A method of treating chemical liquid effluent to render it more environmentally acceptable, comprising the addition of hydrogen peroxide, or a compound capable of liberating hydrogen peroxide, to the effluent to react with and break down a sequestering agent. The reaction rate may be enhanced by the addition of a small amount of a compound including a transition metal ion, especially the nitrate or sulphate of iron or manganese.

9 Claims, No Drawings

EFFLUENT TREATMENT

This invention relates to effluent treatment and in particular to the removal of environmentally undesirable components from photographic processing machine effluents.

The overflow from a photographic processor will typically consist of polluting substances such as heavy metal ions, sequestering agents, substances that have a high oxygen demand and colour developing agents and their derivatives, straight disposal of which contravenes sewer regulations in many parts of the world. It is therefore essential that the overflow is converted by chemical or physical means to a liquid which can be removed to a place of safe and legal disposal.

The sequestering or complexing agents, such as EDTA, PDTA and DTPA (ethylene and propylenediaminetetraacetic acid and diethylenetriaminepentaacetic acid respectively) are particularly undesirable in liquid effluent discharges as they tend to assist the dissolution of toxic heavy metals into the water as it flows toward municipal treatment works and as it seeps through the ground. They also often have a high oxygen demand. The use of an ion exchange resin to remove such an agent is already known, for example as disclosed in "Ion Exchange Resins" 1981, published by B.D.H. However this is costly, bulky and transfer the water problem elsewhere and can clean up only about 3 times the volume of the resin bed.

The use of hydrogen peroxide for decomposing iron-EDTA complexes is briefly mentioned, without specific exemplification, in the Journal of Imaging Technology 14, (1988) No. 6 in an article primarily concerned with the recovery of silver from effluent treatment from photofinishing processes. Large amounts of hydrogen peroxide, up to 2.1 lb per gallon of effluent are described as being required, in a process that requires heating up to about 60° C.

U.S. Pat. No. 4,693,833 describes a method of treating radioactive waste water with hydrogen peroxide at a temperature of 60° C.–90° C. in the catalytic presence of copper ions or copper and iron ions.

It has now been found that the addition of hydrogen peroxide, or a compound capable of liberating hydrogen peroxide, in a concentration of as little as 0.6 to 3% by weight of the effluent causes the sequestering agent to break into fragments with less complexing ability, even at room temperature and without the necessary for a catalyst. Although the rate of reaction is slow and may take up to one week at room temperature it may be particularly suitable for adding to a holding tank before it is discharged to the sewer or delivered to the treatment works.

It has further been found that the rate of reaction may be enhanced by the addition of a small amount e.g. 1 ppm of a compound including a transition metal ion, such as iron and manganese, preferably in the form of the nitrate or sulphate.

According to the present invention therefore there is provided a method of treating chemical liquid effluent to render it more environmentally acceptable, comprising the addition of hydrogen peroxide, or a compound capable of liberating hydrogen peroxide, to the effluent to react with and break down a sequestering agent.

Compounds capable of releasing hydrogen peroxide include metal peroxides; compounds which include hydrogen peroxide in their crystal structure such as sodium percarbonate; other peroxy compounds such as sodium perborate, persulphate, or peroxysilicate; or soluble organic peroxides, such as butyl peroxide or benzyl peroxide.

The hydrogen peroxide or a compound such as mentioned above is added in a sufficient quantity to enable the oxidising reaction with the sequestering agent to take place in a convenient length of time. For example, if commercially available 30% hydrogen peroxide is used, from 20 to 100 ml/liter of effluent, preferably 30 to 50 ml/l, is generally found to be suitable. Alteratively a greater volume of a weaker solution is equally suitable e.g. from 75 to 375 ml 8% hydrogen peroxide/liter effluent or from 200 ml to 1 liter 3% hydrogen peroxide/liter effluent.

Although the addition of hydrogen peroxide to destroy a sequestering agent is of particular importance to the photographic industry, it may be applied to any waste liquor containing such an agent.

The invention will now be described with reference to the following example which does not in any way limit the scope of the invention.

EXAMPLE

Solutions were made of various sequestering agents at concentrations of nominally 100 ppm. To each of these solutions was added 10 g/l potassium hydrogen carbonate, to simulate the likely pH and carbonate conditions in a photographic effluent. To samples of each of these agents was added 50 ml/liter 30% hydrogen peroxide. The amount of sequestering agent remaining after 7 days keeping at 20° C. was measured by ion chromatography. A similar set of experiments were set up with the addition of 1 ppm manganese, as the sulphate, to each sample. The amount of remaining sequestering agent was measured after 3 days keeping at 20° C. Another set of experiments was set up and this time iron was added at 1 ppm, as the nitrate. Again the sequestering agent concentrations were measured after 3 days keeping at room temperature.

The results of all these experiments are shown in the table below.

| Sequestering Agent | Residual Sequestering Agent (ppm) | | | |
| --- | --- | --- | --- | --- |
| | No treatment / days | $H_2O_2$ only / days | $H_2O_2$ +Mn 3 days | $H_2O_2$ +Fe 3 days |
| EDTA | 987 | 11 | 36 | 2 |
| PDTA | 1002 | 6 | 5 | 1 |
| DTPA | 988 | 16 | 32 | 2 |

The results shown that the sequestering agents are being destroyed substantially by the peroxide and that the metal ions accelerate the process, especially the iron ion.

I claim:

1. A method of treating photographic chemical liquid effluent comprising overflow from one or more photographic processes to render it more environmentally acceptable, comprising:

providing photographic chemical liquid effluent comprising an organic sequestering agent, and adding at room temperature hydrogen peroxide, or a compound capable of liberating hydrogen peroxide, to said effluent in a concentration which is the equivalent of about 0.6 to 3% by weight, whereby said hydrogen peroxide reacts with and breaks down said organic sequestering agent.

2. A method as claimed in claim 1, wherein said hydrogen peroxide is a solution of 30% hydrogen peroxide and said hydrogen peroxide solution is added to said effluent in a concentration of 20 to 100 ml/liter effluent.

3. A method as claimed in claim 1, wherein said hydrogen peroxide is a solution of 30% hydrogen peroxide and said hydrogen peroxide solution is added to said effluent in a concentration of 30 to 50 ml/liter effluent.

4. A method as claimed in claim 1, wherein said hydrogen peroxide is a solution of 8% hydrogen peroxide and said hydrogen peroxide solution is added to said effluent in a concentration of 75 to 375 ml/liter effluent.

5. A method as claimed in claim 1, wherein said hydrogen peroxide is a solution of 3% hydrogen peroxide and said hydrogen peroxide solution is added to said effluent in a concentration of 200 ml to 1 liter/liter effluent.

6. A method as claimed in claim 1, wherein said sequestering agent is ethylenediaminetetraacetic acid, propylenediaminetetraacetic acid, or diethylenetriaminepentaacetic acid.

7. A method as claimed in claim 1, further comprising adding a compound including a transition metal ion to said effluent.

8. A method as claimed in claim 7, wherein said transition metal ion is iron.

9. A method as claimed in claim 7, wherein said compound is a nitrate or a sulphate.

* * * * *